United States Patent
Bellinghausen et al.

[19]

[11] Patent Number: 6,045,249
[45] Date of Patent: Apr. 4, 2000

[54] TWIST-IN LIGHT PIPE

[75] Inventors: Carl P. Bellinghausen, Newton; David T. Coleman, Succasunna, both of N.J.

[73] Assignee: Lucent Technologies Inc., Murray Hill, N.J.

[21] Appl. No.: 09/232,978

[22] Filed: Jan. 19, 1999

[51] Int. Cl.[7] ........................................ F21V 8/00
[52] U.S. Cl. .......................... 362/555; 362/551; 362/581; 340/815.45
[58] Field of Search ..................................... 362/551, 555, 362/581, 800, 249, 234; 340/815.45

[56] References Cited

U.S. PATENT DOCUMENTS

| | | | |
|---|---|---|---|
| 4,504,830 | 3/1985 | Boehme | 340/815.31 |
| 4,935,856 | 6/1990 | Dragoon | 362/307 |
| 5,481,440 | 1/1996 | Oldham et al. | 362/555 |
| 5,938,324 | 8/1999 | Salmon et al. | 362/555 |

*Primary Examiner*—Laura K. Tso

[57] ABSTRACT

The combination of a light pipe and a face plate having an opening to receive the light pipe. The light pipe and the face plate opening are formed with complementary polarizing features so that the light pipe can only be inserted into the opening with a predetermined angular orientation about its axis. After insertion into the opening, the light pipe is rotated about its axis to lock it in place. The face plate may then be secured to the edge of a circuit board with the light pipe in alignment to receive light emitted from an indicator light source mounted to the circuit board.

9 Claims, 3 Drawing Sheets

TWIST-IN LIGHT PIPE

BACKGROUND OF THE INVENTION

This invention relates to light pipes and, more particularly, to an improved mounting and alignment arrangement for a light pipe.

Light pipes are used in a wide variety of electronic assemblies to guide light from an indicator light source mounted to a circuit board within the assembly to a user visible external area. In the past, the light pipes have been part of the circuit board assembly which includes light pipes press fit into holes in the circuit board. When the circuit board is assembled into its final package, the visible ends of the light pipes must be aligned with, and inserted through, respective holes in a face plate. This alignment is not always straightforward and easy to accomplish, especially in cases where there are numerous light pipes in the same area.

FIG. 1 illustrates a typical prior art installation of a light pipe 10 to a face plate 12 and a circuit board 14. An indicator light source 16, illustratively a light emitting diode, is mounted to the circuit board near the edge to which the face plate 12 is secured. The circuit board 14 is formed with a pair of openings 18 between each LED 16 and the face plate 12. The openings 18 are along a line extending from the LED 16 toward the face plate 12 and orthogonal to the face plate 12. The light pipe 14 includes a pair of downwardly depending legs 20 each adapted to be press fit into a respective one of the openings 18 to secure the light pipe 10 to the circuit board 14 so that the light receiving end of the light pipe 10 is closely adjacent the LED 16. The face plate 12 has an indicator area formed with an opening 22 adapted to receive therethrough the light emitting end of the light pipe 10, and therefore is aligned with the openings 18 and the LED 16. Before the face plate 12 can be secured to the circuit board 14, the light emitting end of the light pipe 10 must be inserted through the opening 22. If there are several such light pipes 10 arrayed along the edge of the circuit board 14, the alignments of all of the light pipes 10 with their respective openings 22 in the face plate 12 can prove to be complicated and difficult to attain.

It would therefore be desirable to provide an improved alignment and mounting arrangement for such a light pipe.

SUMMARY OF THE INVENTION

The inventive light pipe construction has a feature at its light emitting end which can be axially inserted into, and then rotated within, a mating hole in the face plate. This allows the light pipe to be assembled to the final package, rather than to the circuit board, thereby eliminating alignment problems.

The present invention provides a light pipe in combination with a face plate having an indicator area with an opening therethrough. The light pipe has a light receiving end, a light emitting end, and a generally cylindrical shank extending axially between the light receiving end and the light emitting end. The shank has a recess of predetermined depth along a length thereof which is equal to the thickness of the face plate. The recess is spaced from the light emitting end and the shank has a channel of the predetermined depth and of predetermined arcuate width extending parallel to the shank axis from the light emitting end to the recess. The face plate opening is generally circular and sized to receive the light pipe shank. The face plate has a projection extending into the opening by the predetermined depth along the predetermined arcuate width.

In accordance with an aspect of this invention, the channel and the face plate projection together act as a keying arrangement. Accordingly, the light pipe shank can be axially inserted into the face plate opening and the light pipe shank can then be rotated about its axis to capture the face plate projection within the light pipe shank recess so that the light pipe is held by the face plate with the shank axis orthogonal to the face plate.

In accordance with another aspect of this invention, the recess has an arcuate width greater than the predetermined arcuate width of the channel and the channel is aligned with one of the angular extremes of the recess. Accordingly, the light pipe shank can be axially inserted into the face plate opening and rotated about its axis until the face plate projection abuts the other of the angular extremes of the recess to effect a final predetermined angular orientation of the light pipe about the shank axis with respect to the face plate.

In accordance with a further aspect of this invention, the light pipe shank has two recesses and two corresponding channels and the face plate has two projections each corresponding to a respective one of the channels. The two projections are angularly displaced the same as the two channels.

In accordance with yet another aspect of this invention, the channels are angularly displaced nondiametrically around the light pipe shank. Accordingly, the two channels and the two projections function as polarizing features to insure an initial predetermined angular orientation of the light pipe for insertion into the face plate opening.

BRIEF DESCRIPTION OF THE DRAWINGS

The foregoing will be more readily apparent upon reading the following description in conjunction with the drawings in which like elements in different figures thereof are identified by the same reference numeral and wherein.

DETAILED DESCRIPTION

Figure 1:
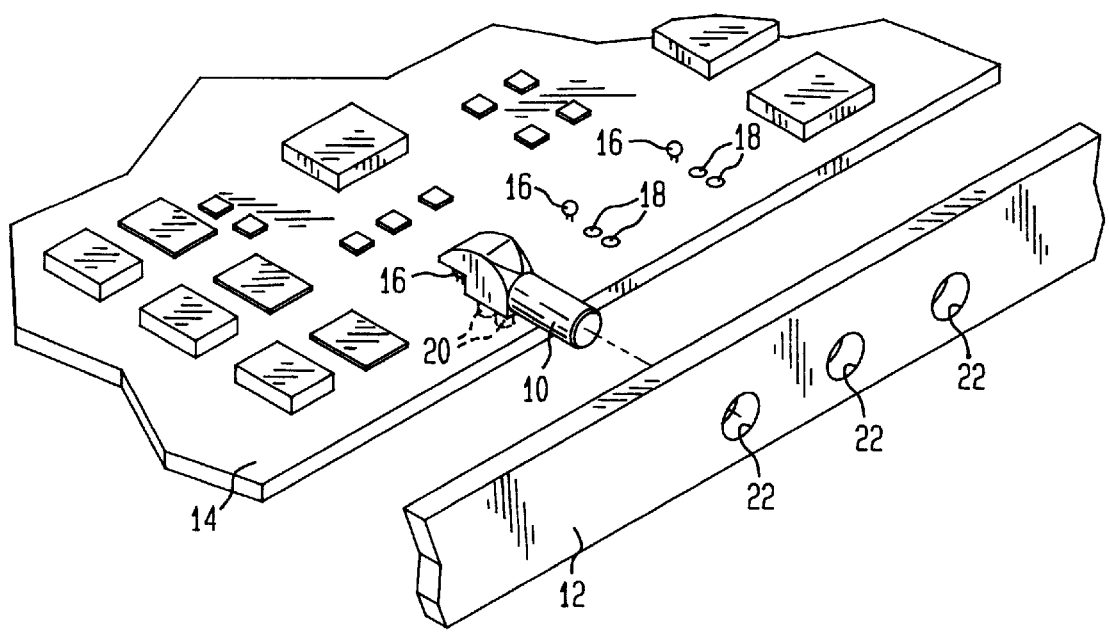
FIG. 1 is a perspective view showing a typical prior art installation of a light pipe to a face plate and a circuit board.
Figure 2:
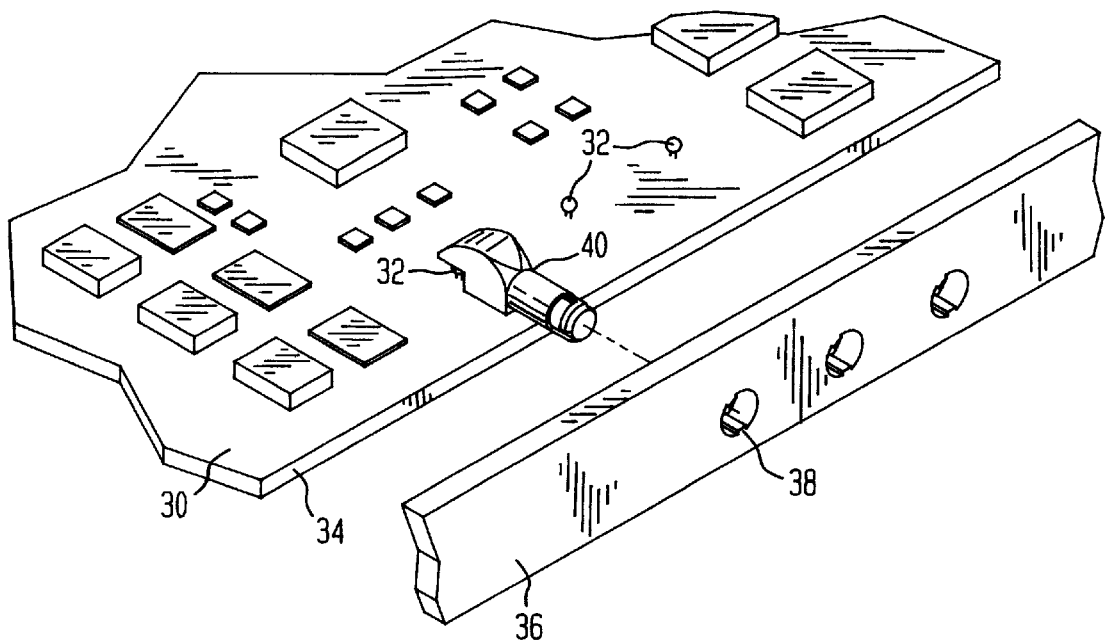
FIG. 2 is a perspective view similar to FIG. 1 showing the inventive combination of a light pipe and a face plate.

FIGS. 2–6 illustrate inventive constructions which overcome the above-described deficiencies of the prior art. As shown in the FIG. 2, the circuit board 30 has one or more light emitting diodes 32 mounted thereon along a line parallel to the edge 34 of the circuit board 30 to which the face plate 36 is to be secured. The face plate 36 is formed with a plurality of openings 38, each of which corresponds to a respective one of the light emitting diodes 32 and is aligned therewith along a line which is orthogonal to the edge 34 and passes through the respective light emitting diode 32. Specifically, each opening 38 is on a respective first line which is orthogonal to the face plate 36 and intersects a respective second line orthogonal to the circuit board 30 and passing through the respective light emitting diode 32. A light pipe 40 has its light emitting end installed through an opening 38 in the face plate 36, as will be described in full detail hereinafter, prior to the face plate 36 being secured to the circuit board 30. When the face plate 36 is thereafter secured to the circuit board 30, the light receiving end of the light pipe 40 is adjacent the respective light emitting diode 32. Since a plurality of light pipes 40 can be preassembled to the face plate 36 according to the present invention, when the face plate 36 is subsequently secured to the circuit board 30, all of the preassembled light pipes are aligned with respective light emitting diodes, thus overcoming the alignment problem inherent in the prior art construction.

Figure 3:
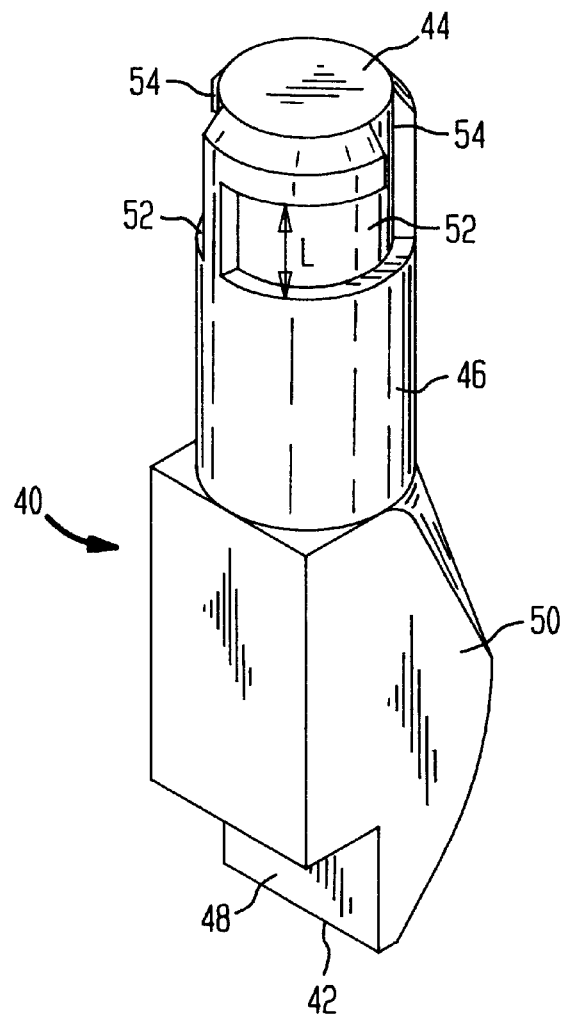
FIG. 3 is a perspective view of a first embodiment of an inventive light pipe.
Figure 4:
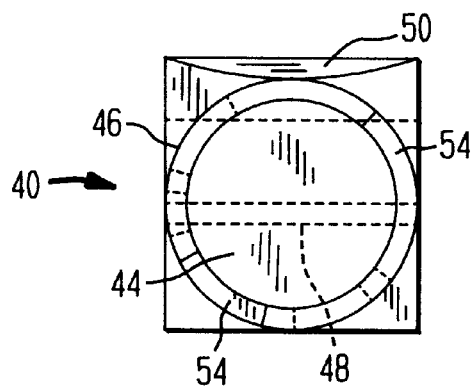
FIG. 4 is an end view of the light emitting end of the light pipe shown in FIG. 3.

As shown in FIGS. 3 and 4, the light pipe 40 according to the present invention has a light receiving end 42, a light emitting end 44, and a generally cylindrical shank 46 extending axially between the light receiving end 42 and the light emitting end 44. The light receiving end 42 has a planar face 48 which is parallel to the axis of the shank 46 and a prism 50 which refracts light which enters the light pipe 40 through the face 48 orthogonally thereto along the shank axis toward the light emitting end 44. In this regard, the light pipe 40 is similar to the prior art light pipe 10 (FIG. 1).

The present invention provides a construction for the light pipe 40 and the face plate 36 whereby the light pipe 40 can be secured to the face plate 36 in a predetermined orientation. Thus, the face plate 36 can thereafter be secured to the circuit board 30 with the light receiving end 42 of the light pipe 40 being closely adjacent the respective light emitting diode 32 so that light emitted therefrom enters the light pipe 40 through the planar face 48 orthogonally thereto. To effect such mounting, the shank 46 of the light pipe 40 is formed with a recess 52 which has a predetermined depth along an axial length L equal to the thickness of the face plate 36. The recess 52 is spaced from the light emitting end 44. The shank 46 also has a channel 54 which extends parallel to the shank axis from the light emitting end 44 to the recess 52. The channel 54 is of the same predetermined depth as the recess 52 and has a predetermined arcuate width. As shown, the arcuate width of the recess 52 is greater than the arcuate width of the channel 54, with the channel 54 being aligned with one of the angular extremes of the recess 52. Preferably, the light emitting end 44 is chamfered along its outer periphery to assist in the insertion of the light pipe 40 into the opening 38. Also, preferably, there are two such recesses 52 and channels 54 which are angularly displaced nondiametrically with respect to the shank 46, as can be best viewed in FIG. 4, so that the shank 46 is asymmetrical.

Figure 6:
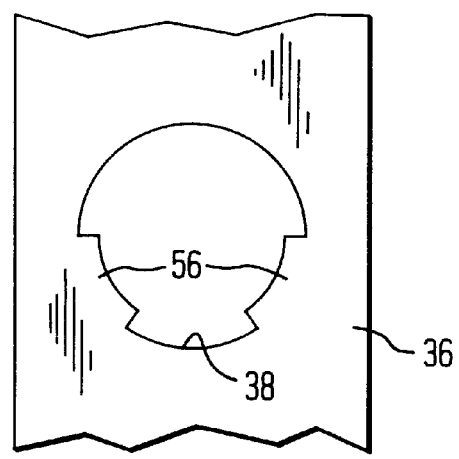
FIG. 6 is an elevational view of a face plate with an opening for accommodating an inventive light pipe.

As shown in FIG. 6, the opening 38 in the face plate 36 is generally circular with a diameter equal to the diameter of the shank 46. However, there are two projections 56 extending into the opening 38. Each of the projections 56 corresponds to a respective channel 54. Thus, each of the projections 56 has an arcuate width equal to the arcuate width of the channel 54 and extends into the opening 38 by an amount equal to the predetermined depth of the recess 52 and the channel 54. The projections 56 are angularly displaced the same as the channels 54 so that the channels 54 together with the projections 56 function as polarizing features to insure an initial predetermined angular orientation of the light pipe 40 for insertion into the opening 38 of the face plate 36. Thus, when the shank 46 of the light pipe 40 is inserted into the opening 38, the insertion continues until the projections 56 pass through the channels 54 and enter the recesses 52. Since the axial length L of the recesses 52 is equal to the thickness of the face plate 36, a subsequent rotation of the light pipe 40 captures the projections 56 between the axially spaced walls of the recesses 52. This holds the light pipe 40 to the face plate 36 with the axis of the shank 40 being orthogonal to the face plate 36.

The dimensions of the light pipe 40 and the opening 38 are chosen so that a tight fit of the light pipe to the face plate is attained. Thereafter, the face plate 36 can be secured to the circuit board 30. Illustratively, the dimensions of the recesses 52 and the projections 56 are chosen so that after the light pipe 40 is inserted in the opening 38 the light pipe 40 is rotated approximately 90° about the shank axis until each projection 56 abuts the other of the angular extremes of the respective recess 52. This effects a final predetermined angular orientation of the light pipe 40 about the shank axis with respect to the face plate 36. In this orientation, the light pipe 40 is held so that when the face plate 36 is secured to the circuit board 30, the planar face 48 is above the respective light emitting diode 32 and parallel to the circuit board 30.

Figure 5:
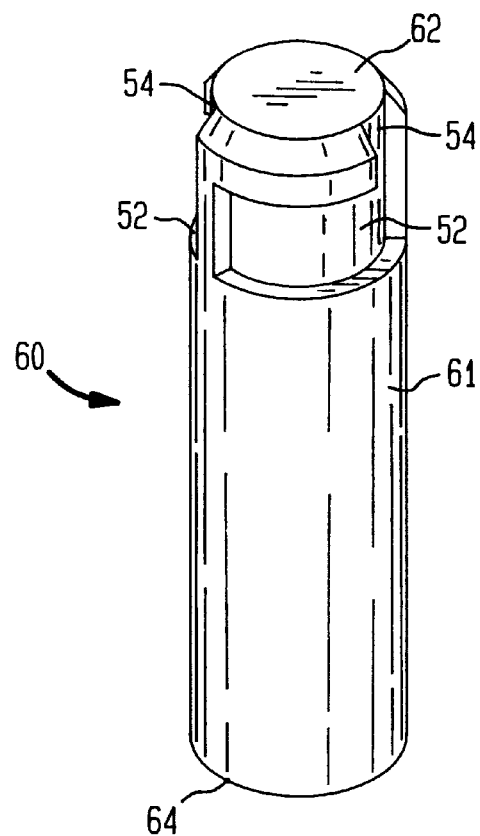
FIG. 5 is a perspective view of a second embodiment of an inventive light pipe.

FIG. 5 shows another embodiment of a light pipe 60 wherein the cylindrical shank 61 is formed at the light emitting end 62 with the same combination of recesses 52 and channels 54 as the light pipe 40 (FIGS. 3 and 4). However, the light receiving end 64 of the light pipe 60 is formed with a planar face orthogonal to the shank axis. Thus, when the light pipe 60 is utilized, the light receiving end 64 is adjacent to a respective light emitting diode 32 so that light from the light emitting diode 32 enters the light receiving end 64 orthogonally to the planar face and travels axially through the shank 61.

Accordingly, there has been disclosed an improved mounting and alignment arrangement for a light pipe. While illustrative embodiments of the inventive construction have been disclosed herein, it is understood that various adaptations and modifications to the disclosed embodiments are possible and it is intended that this invention be limited only by the scope of the appended claims.

What is claimed is:

1. In combination:

a face plate having an indicator area with an opening therethrough; and a light pipe having a light receiving end, a light emitting end, and a generally cylindrical shank extending axially between the light receiving end and the light emitting end, the shank having a recess of predetermined depth along a length thereof which is equal to the thickness of the face plate, the recess being spaced from the light emitting end, and the shank having a channel of said predetermined depth and of predetermined arcuate width extending parallel to the shank axis from the light emitting end to the recess;

wherein the face plate opening is generally circular and sized to receive the light pipe shank, the face plate having a projection extending into the opening by said predetermined depth along said predetermined arcuate width.

2. The combination according to claim 1 wherein said channel and said face plate projection together act as a keying arrangement so that said light pipe shank can be axially inserted into said face plate opening and said light pipe shank can then be rotated about its axis to capture said face plate projection within said light pipe shank recess, whereby said light pipe is held by said face plate with the shank axis orthogonal to the face plate.

3. The combination according to claim 1 wherein said recess has an arcuate width greater than said predetermined arcuate width of said channel and said channel is aligned with one of the angular extremes of said recess;

whereby said light pipe shank can be axially inserted into said face plate opening and rotated about the shank axis until said face plate projection abuts the other of the angular extremes of said recess to effect a final predetermined angular orientation of said light pipe about the shank axis with respect to said face plate.

4. The combination according to claim 3 wherein:

said light pipe shank has two recesses and two corresponding channels; and said face plate has two projections each corresponding to a respective one of said channels and angularly displaced the same as said channels.

5. The combination according to claim 4 wherein:

said two channels are angularly displaced nondiametrically with respect to said light pipe shank;

whereby the two channels and the two projections function as polarizing features to insure an initial predetermined angular orientation of said light pipe for insertion into said face plate opening.

6. The combination according to claim 4 further comprising:

a circuit board having an indicator light source mounted thereon;

wherein the face plate is orthogonal to the circuit board and is secured to an edge of the circuit board with the face plate opening being located so that a first line through the opening and orthogonal to the face plate intersects a second line orthogonal to the circuit board and passing through the indicator light source; and wherein the light pipe shank extends parallel to and spaced from the circuit board between the face plate and the indicator light source with the light pipe light receiving end being adjacent the indicator light source to receive light emitted thereby and direct the light axially along the light pipe shank to the light pipe light emitting end.

7. The combination according to claim 6 wherein the light pipe light receiving end includes a planar face orthogonal to the shank axis and adjacent to the indicator light source;

whereby light from the indicator light source enters the light pipe through the planar face orthogonally thereto and travels axially along the light pipe shank to the light pipe light emitting end.

8. The combination according to claim 6 wherein the light pipe light receiving end includes a planar face parallel to the shank axis and a prism which refracts light which enters the light pipe through the planar face orthogonally thereto along the shank axis toward the light pipe light emitting end, the light pipe being held by the face plate so that the planar face is adjacent to the indicator light source and light emitted by the indicator light source impinges on the planar face orthogonally thereto.

9. The combination according to claim 8 wherein the light pipe is held by the face plate so that the planar face is above the indicator light source relative to the circuit board and the planar face is parallel to the circuit board.

* * * * *